J. KINZEY.
TROLLEY.
APPLICATION FILED MAR. 19, 1912.
1,050,143.
Patented Jan. 14, 1913.
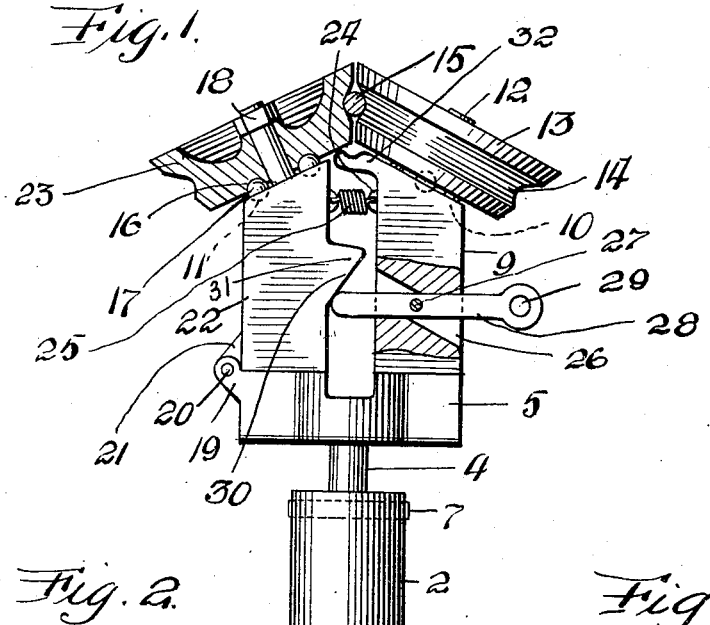
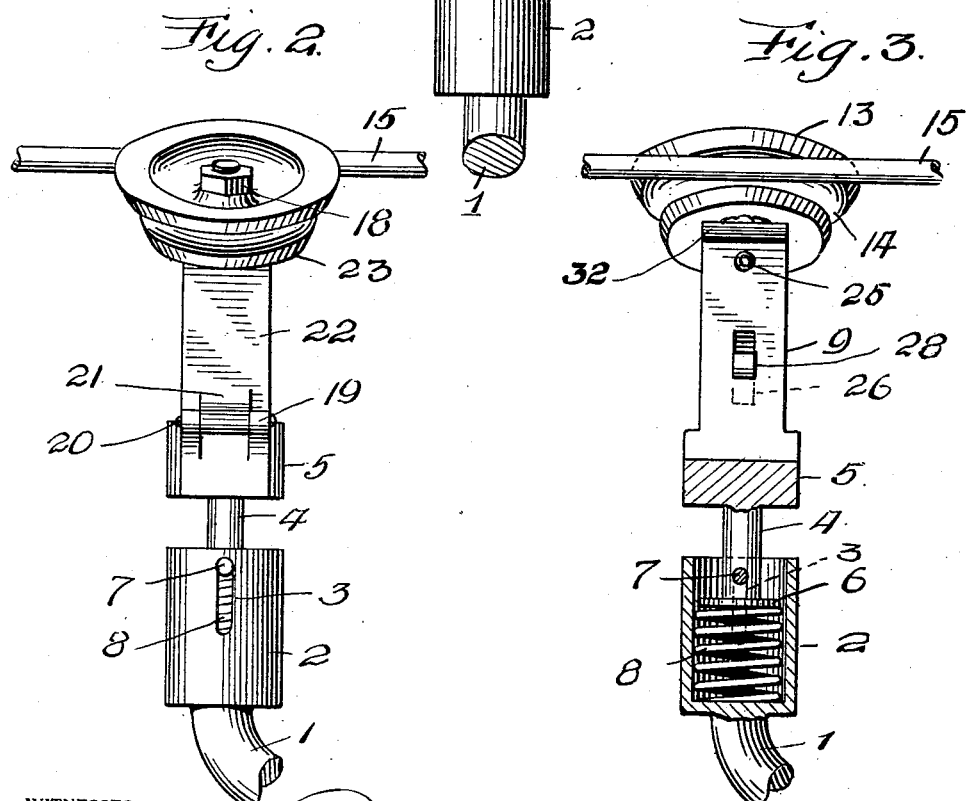
WITNESSES
Samuel Payne
Ralph C. Evert
INVENTOR
J. Kinzey
BY
ATTORNEYS
COLUMBIA PLANOGRAPH CO., WASHINGTON, D. C.

UNITED STATES PATENT OFFICE.

JOHN KINZEY, OF PITTSBURGH, PENNSYLVANIA.

TROLLEY.

1,050,143.

Specification of Letters Patent.　Patented Jan. 14, 1913.

Application filed March 19, 1912. Serial No. 684,663.

*To all whom it may concern:*

Be it known that I, JOHN KINZEY, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and the objects of my invention are the provision of positive and reliable means, as hereinafter set forth, for maintaining a positive electrical connection or contact with a trolley wire, rail or electric conductor, and to provide a trolley that can be advantageously used in connection with high speed suburban electric railways.

Other objects of my invention are to provide a trolley of the above type that does not interfere with frogs, guard rails or other overhead construction of a trolley railway, and to provide a trolley harp that can adjust itself relatively to a trolley wire whereby the trolley wheel will not become accidentally displaced due to irregularities in the trolley wire or a curved section of the wire.

With the above and other objects in view, the invention resides in the novel construction, combination and arrangement of parts to be hereinafter specifically described and then claimed.

Reference will now be had to the drawing, wherein:—

Figure 1 is a front elevation of the trolley partly broken away and partly in section, Fig. 2 is a side elevation of the same, and Fig. 3 is a vertical sectional view of the trolley.

The reference numeral 1 denotes a portion of a trolley pole that has the upper end thereof curved and provided with a vertical tubular housing 2 that has oppositely disposed walls thereof provided with vertical slots 3. Extending into the housing 2 is the stem or reduced end 4 of a harp base 5, said stem having the lower end thereof provided with a circular head 6. The stem 4 is provided with a transverse pin 7 having the ends thereof extending into the slot 3, said pin limiting the movement of the stem 4 relatively to the housing 2. Arranged within the housing 2, between the bottom thereof and the head 6 of the stem 4, is a coiled compression spring 8 that normally holds the stem 4 in an elevated position.

One end of the harp base 5 is provided with an integral vertical arm 9 that has the upper end thereof beveled, as at 10 and provided with an annular ball race 11. The upper beveled end 10 of the arm 9 has a pin 12 and revolubly mounted upon said pin is an angularly disposed trolley wheel 13 that has an annular groove 14 to receive a trolley wire 15. The trolley wheel 13 has an annular ball race 16 confronting the race 11 and arranged within said races are antifrictional balls 17 that insure an easy revoluble movement of the trolley wheel 13 at the upper beveled end 10 of the stationary arm 9. The trolley wheel 13 is retained upon the pin 12 by a nut 18 screwed upon the upper end thereof. The opposite end of the harp base 5 has apertured lugs 19 and pivotally mounted between said lugs by a pin 20 is the apertured extension 21 of a movable arm 22. The lower end of the arm 22 normally rests upon the trolley base 5 and the upper end thereof is beveled and provided with a revoluble angularly disposed trolley wheel 23, similar in all respects to the trolley wheel 13.

The confronting faces of the arms 9 and 22, adjacent to the upper beveled ends thereof, are provided with apertured ears 24 connected by a coiled retractile spring 25. The spring 25 normally holds the movable arm 22 in parallelism with the arm 9 and with the trolley wheels of said arms in engagement with the trolley wire 15.

The stationary arm 9 is formed with a transverse slot 26 having the wall thereof formed with flattened portions offset with respect to each other and disposed in parallel planes. The wall of the slot 26 is further provided with inclined portions offset with respect to each other and disposed in parallel planes. Pivotally mounted in said slot 26 by a pin 27 is a lever 28 that has the outer end thereof provided with an eye 29 and the inner end thereof rounded. The flattened and inclined portions of the wall of the slot 26 provide clearances for the operation of the lever 28 as an inclined portion opposes a flattened portion. The rounded end of the lever 28 engages the beveled surface 30 of an enlargement 31, carried by the inner side of the movable arm 22. A cord is attached to the eye 29 of the lever 28 and when said cord is pulled downwardly, the inner end of the lever 28 is elevated to ride against the beveled surface 30 of the enlargement 31 and force the movable arm 22 outwardly. Such movement of the arm 22 separates the trolley wheels 13 and 23, thereby permitting of the harp being removed from the wire. Immediately upon the cord being released, the coiled retractile spring 25 restores the movable arm 22 to its normal position. To prevent the wire 15 from passing downwardly between the movable and stationary arms of the harp, the upper end of the stationary arm 9 has a support 32 upon which the wire rests when the movable arm 22 is open relatively to the stationary arm.

From the foregoing it will be observed that the harp base 5 is yieldably supported relatively to the pole 1, consequently the harp can adjust itself to a sagging trolley wire. The two trolley wheels 13 and 23 insure a positive contact with the trolley wire 15 and when a car is passing around a curve, the wheels cannot become accidentally displaced relatively to the trolley wire.

While in the drawing there is illustrated a preferred embodiment of the invention, it is to be understood that the structural elements are susceptible to such variations and modifications as fall within the scope of the appended claims.

What I claim is:—

1. In a trolley, the combination with a pole, of a yieldable harp base carried by the upper end of said pole, a stationary arm carried by said harp base, a movable arm carried by said harp base and opposing said stationary arm and having its inner face provided with an enlargement having a beveled surface, revoluble angularly disposed trolley wheels carried by the upper ends of said arms, and a pivoted lever extending through said stationary arm and adapted to be actuated to engage the beveled surface of said enlargement to shift said movable arm relatively to said stationary arm.

2. In a trolley, the combination with a pole, of a yieldable harp base carried by the upper end of said pole, a stationary arm carried by said harp base, a movable arm carried by said harp base and opposing said stationary arm and having its inner face provided with an enlargement having a beveled surface, revoluble angularly disposed trolley wheels carried by the upper ends of said arms, a pivoted lever extending through said stationary arm and adapted to be actuated to engage the beveled surface of said enlargement to shift said movable arm relatively to said stationary arm, and means arranged between the confronting faces of said arms and adapted to retain said movable arm normally in parallelism with said stationary arm.

3. In a trolley, the combination with a pole, of a harp base yieldably supported by the upper end thereof, a stationary arm carried by one end of said harp base, a movable arm carried by the opposite end of said harp base and having its inner face provided with an enlargement having a beveled face, said arms having the upper ends thereof beveled, pins carried by the upper ends of said arms, angularly disposed trolley wheels revolubly mounted upon said pins, a lever pivotally supported by said stationary arm and engaging said beveled surface whereby said arm can be shifted when said lever is moved, and means interposed between said arms above said enlargement for retaining said movable arm normally in parallelism with said stationary arm.

4. A trolley comprising a harp base adapted to be carried by the upper end of a pole, a stationary harp arm integral with said base and having its upper end provided with an inwardly extending grooved support and intermediate its ends formed with a slot, a movable harp arm hinged to said base and opposing the stationary arm, revoluble angularly disposed trolley wheels mounted upon the tops of said arms, a lever pivotally mounted in and extending through said slot and adapted when actuated to engage and shift said movable arm relatively to said stationary arm, the walls of said slot having inclined portions to provide clearances for the operation of said lever.

5. In a trolley, a pole, a harp base yieldably supported by the upper end of said pole, a stationary arm carried by said harp base, a wire support carried by the upper end of said stationary arm at the inner side thereof, a movable arm carried by said harp base, pins carried by the upper ends of said arms, angularly disposed trolley wheels revolubly mounted upon said pins, anti-friction balls interposed between said wheels and the upper ends of said arms, a lever pivotally mounted in said stationary arm and engaging said movable arm whereby when said lever is moved said movable arm will be shifted relatively to said stationary arm, and means connecting said arms for retaining said movable arm normally in parallelism with said stationary arm.

In testimony whereof I affix my signature in the presence of two witnesses.

JOHN KINZEY.

Witnesses:
MAX H. SROLOVITZ,
CHRISTINA T. HOOD.